United States Patent
Yang et al.

(10) Patent No.: US 11,055,192 B2
(45) Date of Patent: Jul. 6, 2021

(54) LOGGING IMPLEMENTATION IN MICRO-SERVICE APPLICATIONS

(71) Applicant: INTERNATIONAL BUSINESS MACHINES CORPORATION, Armonk, NY (US)

(72) Inventors: Lin Yang, Beijing (CN); Yuan Wang, Beijing (CN); Guang Cheng Li, Beijing (CN); Jing Min Xu, Beijing (CN); Jian Ma, Beijing (CN); Xiao Xi Liu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 205 days.

(21) Appl. No.: 16/144,791

(22) Filed: Sep. 27, 2018

(65) Prior Publication Data
US 2020/0104226 A1    Apr. 2, 2020

(51) Int. Cl.
*G06F 11/30* (2006.01)
*G06F 11/00* (2006.01)
(Continued)

(52) U.S. Cl.
CPC .......... *G06F 11/3072* (2013.01); *G06F 9/542* (2013.01); *G06F 11/008* (2013.01);
(Continued)

(58) Field of Classification Search
CPC .............. G06F 11/3072; G06F 11/008; G06F 11/3006; G06F 11/3082; G06F 11/3086;
(Continued)

(56) References Cited

U.S. PATENT DOCUMENTS

| 7,120,685 B2 | 10/2006 | Ullmann et al. |
| 7,661,032 B2 | 2/2010 | Eberbach et al. |

(Continued)

FOREIGN PATENT DOCUMENTS

CN    105808414    7/2016

OTHER PUBLICATIONS

Automated and manual monitoring—Amazon Elastic Compute Cloud. Jan. 16, 2014 [retrieved on Jun. 15, 2020], Retrieved from the Internet: <URL: https://docs.aws.amazon.com/AWSEC2/latest/UserGuide/monitoring_automated_manual.html>.*

Amazon CloudWatch Product Features—Amazon Web Services (AWS). Jan. 16, 2014 [retrieved on Jun. 15, 2020], Retrieved from the Internet: <URL: https://aws.amazon.com/cloudwatch/features/>.*

(Continued)

*Primary Examiner* — Kamini B Patel
(74) *Attorney, Agent, or Firm* — Tutunjian & Bitetto, P.C.; Joseph Petrokaitis (57) ABSTRACT

A log augmentation system is provided for augmenting log management in a distributed micro-services environment. The log augmentation system includes a trigger device for triggering an augmentation process responsive to micro-service related events and a context of the micro-service related events. The log augmentation system further includes an augmentation rules database with rule management components for determining an augment direction, an augmentation target, and an augmentation correlation relating to the distributed micro-services. The log augmentation system also includes a coordinator for coordinating the augmentation process in the distributed micro-service using a rule-based decision approach. The log augmentation system additionally includes a labeler for applying a set of labels to augment log entries responsive to instructions from the coordinator derived from results of the rule-based decision approach used by the coordinator.

19 Claims, 7 Drawing Sheets

100

(51) Int. Cl.
  *G06F 9/54*   (2006.01)
  *G06F 16/11*  (2019.01)
  *G06F 16/17*  (2019.01)

(52) U.S. Cl.
  CPC ...... *G06F 11/3006* (2013.01); *G06F 11/3086* (2013.01); *G06F 16/122* (2019.01); *G06F 16/1734* (2019.01); *G06F 2201/86* (2013.01)

(58) Field of Classification Search
  CPC .... G06F 16/122; G06F 16/1734; G06F 9/542; G06F 2201/86
  See application file for complete search history.

(56) References Cited

U.S. PATENT DOCUMENTS

| | | | |
|---|---|---|---|
| 9,529,694 B2 | 12/2016 | Srivastava et al. | |
| 2005/0010929 A1* | 1/2005 | Wang | H04L 63/1425 719/318 |
| 2010/0115443 A1* | 5/2010 | Richstein | G06F 11/0706 715/771 |
| 2012/0005542 A1* | 1/2012 | Petersen | G06F 21/552 714/48 |
| 2015/0025875 A1* | 1/2015 | Perrone | G06F 40/30 704/9 |
| 2016/0092295 A1* | 3/2016 | Rajkovic | G06F 11/3476 714/49 |
| 2016/0124742 A1 | 5/2016 | Rangasamy et al. | |
| 2017/0168914 A1* | 6/2017 | Altman | G06F 11/3476 |
| 2018/0139220 A1* | 5/2018 | Viswanathan | G06F 11/3006 |
| 2018/0203795 A1* | 7/2018 | Gadiya | G06F 11/3636 |
| 2018/0336361 A1* | 11/2018 | Gilani | G06F 21/6218 |
| 2019/0356555 A1* | 11/2019 | Bai | H04L 41/145 |
| 2019/0373052 A1* | 12/2019 | Pollitt | H04L 43/026 |

OTHER PUBLICATIONS

Building Resilient and Fault Tolerant Applications with Micro. Oct. 23, 2016 [retrieved on Jun. 15, 2020], Retrieved from the Internet: <URL: https://medium.com/microhq/building-resilient-and-fault-tolerant-applications-with-micro-53b454a8e8eb>.*

Barr, Jeff et al. Building Fault-Tolerant Applications on AWS. Oct. 2011. Amazon Web Services.*

Making your Microservices Resilient and Fault Tolerant. Aug. 6, 2018 [retrieved on Jun. 15, 2020], Retrieved from the Internet: <URL: https://samirbehara.com/2018/08/06/making-your-microservices-resilient-and-fault-tolerant/>.*

Granchelli, Giona, et al. "Microart: A software architecture recovery tool for maintaining microservice-based systems." 2017 IEEE International Conference on Software Architecture Workshops (ICSAW). IEEE, 2017.*

Jung, Mathias et al. Microservices on AWS. Aug. 12, 2016. Amazon Web Services.*

Resiliency and high availability in microservices. Sep. 20, 2020 [retrieved on Jun. 15, 2020], Retrieved from the Internet: <URL: https://docs.microsoft.com/en-us/dotnet/architecture/microservices/architect-microservice-container-applications/resilient-high-availability-microservices>.*

Tools and techniques for logging microservices. Nov. 4, 2015 [retrieved on Jun. 15, 2020], Retrieved from the Internet: <URL: https://www.loggly.com/blog/tools-and-techniques-for-logging-microservices/>.*

Alshuqayran, Nuha, Nour Ali, and Roger Evans. "Towards micro service architecture recovery: An empirical study." 2018 IEEE International Conference on Software Architecture (ICSA). IEEE, 2018.* logz.io, "Tips on Logging Microservices", Available at: https://logz.io, Last downloaded Jul. 6, 2018, 7 pages.

* cited by examiner

LOGGING IMPLEMENTATION IN MICRO-SERVICE APPLICATIONS

BACKGROUND

Technical Field

The present invention generally relates to computer applications, and more particularly to a logging implementation in micro-services applications.

Description of the Related Art

In micro-service applications, services are distributed and autonomous. Without careful designs, the failure of a single service could bring down the whole application. To prevent this, patterns like circuit breaker, bulkhead and client side load balancing are introduced. These patterns let the application tolerate and isolate failures. Therefore, situations that are no longer considered as failures, but result in logs with errors or warning levels being spread, can include, but are not limited to, a server with exhausted thread pools, a client with eighty percent refused connections, or a transaction with diverged traces. For traditional log based monitoring and anomaly detection solutions, the logging environment has significantly changed. Hence, solutions must adopt to this change by recognizing underlying micro-services patterns. Thus, there is a need for an improved logging solution for micro-service applications.

SUMMARY

According to an aspect of the present invention, a log augmentation system is provided for augmenting log management in a distributed micro-services environment. The log augmentation system includes a trigger device for triggering an augmentation process responsive to micro-service related events and a context of the micro-service related events. The log augmentation system further includes an augmentation rules database with rule management components for determining an augment direction, an augmentation target, and an augmentation correlation relating to the distributed micro-services. The log augmentation system also includes a coordinator for coordinating the augmentation process in the distributed micro-service using a rule-based decision approach. The log augmentation system additionally includes a labeler for applying a set of labels to augment log entries responsive to instructions from the coordinator derived from results of the rule-based decision approach used by the coordinator.

According to another aspect of the present invention, a computer-implemented method is provided for augmenting log management in a distributed micro-services environment. The method includes triggering, by a trigger device, an augmentation process responsive to micro-service related events and a context of the micro-service related events. The method further includes determining, by an augmentation rules database with rule management components, an augment direction, an augmentation target, and an augmentation correlation relating to the distributed micro-services. The method also includes coordinating, by a coordinator, the augmentation process in the distributed micro-services using a rule-based decision approach. The method additionally includes applying, by a labeler, a set of labels to augment log entries responsive to instructions from the coordinator derived from results of the rule-based decision approach used by the coordinator.

According to yet another aspect of the present invention, a computer program product is provided for augmenting log management in a distributed micro-services environment. The computer program product includes a non-transitory computer readable storage medium having program instructions embodied therewith. The program instructions are executable by a computer to cause the computer to perform a method. The method includes triggering, by a trigger device of the computer, an augmentation process responsive to micro-service related events and a context of the micro-service related events. The method further includes determining, by an augmentation rules database with rule management components of the computer, an augment direction, an augmentation target, and an augmentation correlation relating to the distributed micro-services. The method also includes coordinating, by a coordinator of the computer, the augmentation process in the distributed micro-services using a rule-based decision approach. The method additionally includes applying, by a labeler of the computer, a set of labels to augment log entries responsive to instructions from the coordinator derived from results of the rule-based decision approach used by the coordinator.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to a logging implementation in micro-services applications.

Figure 1:
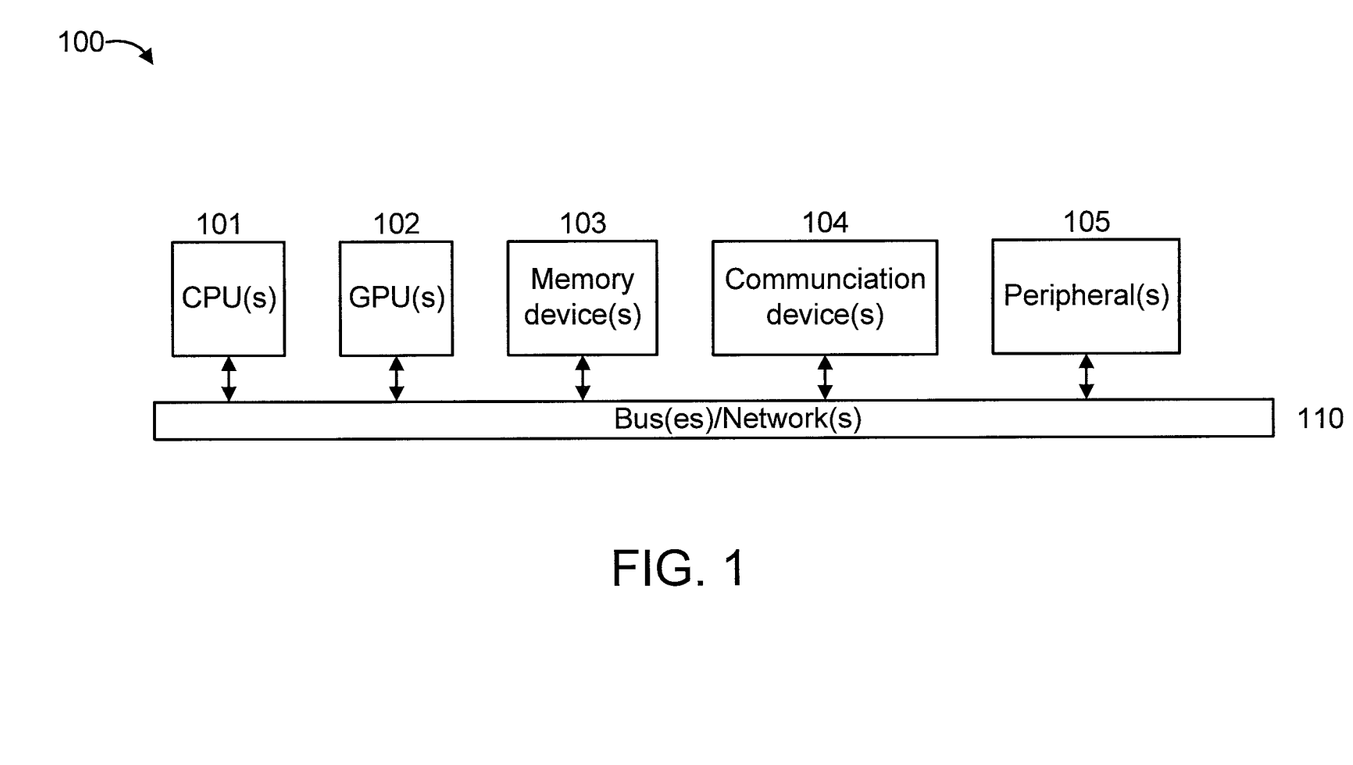
FIG. 1 is a block diagram showing an exemplary processing system to which the present invention may be applied, in accordance with an embodiment of the present invention.

FIG. 1 is a block diagram showing an exemplary processing system 100 to which the present invention may be applied, in accordance with an embodiment of the present invention. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, and so forth. Elements of processing system 100 are connected by one or more buses or networks (collectively denoted by the figure reference numeral 110).

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. Further, in another embodiment, a cloud configuration can be used (e.g., see FIGS. 6-7). For example, system 100 can represent at least a portion of a node in a cloud computing environment. These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

Figure 2:
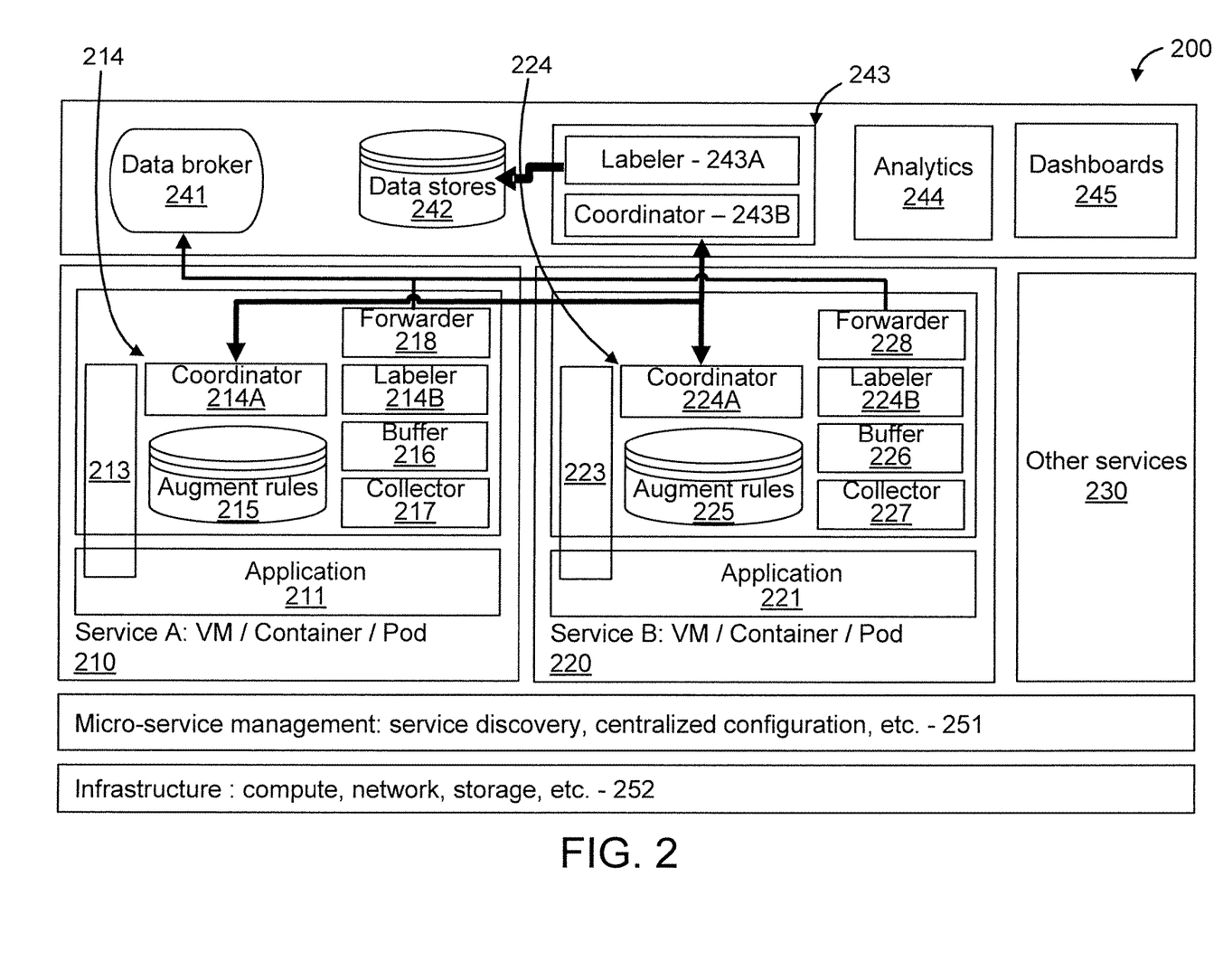
FIG. 2 is a block diagram showing an exemplary system/environment to which the present invention can be applied, in accordance with an embodiment of the present invention.

FIG. 2 is a block diagram showing an exemplary system/environment 200 to which the present invention can be applied, in accordance with an embodiment of the present invention.

System/environment 200 includes a micro-service A 210 and a micro-service B 220. The system/environment 200 can also include other services 230.

Micro-Service A 210 and micro-service B 220 can be the same type or different types of micro-services. Each of micro-service A 210 and micro-service B 220 can implemented using a Virtual Machine (VM), a standalone container, or a side-car container of a pod. In an embodiment, the micro-services A 210 and B 220 can be implemented by respective nodes in a cloud computing environment or other distributed environment. Of course, other implementations could also be used, while maintaining the spirit of the present invention.

Micro-service A 210 includes an application 211 and an agent/sidecar 212. The agent/sidecar 212 (of micro-service A 210) includes a trigger 213, a coordinator and labeler pair 214 (formed from a coordinator 214A and a labeler 214B), an augment rules element 215, a buffer 216, a collector 217, and a forwarder 218.

Micro-service B 220 includes an application 221 and an agent/sidecar 222. The agent/sidecar 222 (of micro-service B 220) includes a trigger 223, a coordinator and labeler pair 224 (formed from a coordinator 224A and a labeler 224B), an augment rules element 225, a buffer 226, a collector 227, and a forwarder 228.

The system/environment 200 can further include a data broker 241, a data stores 242, a coordinator and labeler pair 243 (formed from a coordinator 243A and a labeler 243B), an analytics element 244, and dashboards 245. The system/environment 200 can also include a micro-service management element 251 and system infrastructure elements 252.

The coordinator and labeler pair 243 access the data broker 241 and the data stores 242, as well as the coordinators and labeler pairs 214 and 224 of each of the service agents 212 and 222. The purpose of the optional labeler 243A and coordinator 243B in the data stores side is to handle the potential failure/exception from the application side, for example, if the involved container got killed or migrated to somewhere else before the log augmentation process finished, then the labeler 243A and coordinator 243B in the data stores side will take care of the remaining steps of the log augmentation process.

The micro-service management element 251 can perform functions including, but not limited to, service discovery, centralized configuration management, and so forth.

The system infrastructure elements 252 can include, for example, computing elements, network elements (routers, gateways, etc.), storage elements, and so forth.

The analytics element 244 can be configured to perform log analysis using statistical and/or (machine) learning techniques. The analytics element 244 can include (and, in other embodiments, interface with) an analytics action element 244A for performing an action responsive to a result of a log analysis, where such analysis is performed on an augmented log in accordance with the present invention. The analytics action element 244A can perform any of a myriad of possible actions, depending upon the implementation. For example, in an embodiment, a backup micro-service can be deployed to replace a failing micro-service (as indicated by augmented log data), a supplemental micro-service can be deployed to assist an overloaded micro-service (as determined relative to a threshold applied relative to augmented log data), a failing micro-service (as indicated by augmented log data) can be removed from operation and/or user access, and so forth. These and other actions that can be performed are readily determined by one of ordinary skill in the art given the teachings of the present invention provided herein, while maintaining the spirit of the present invention.

System/environment 200 can include other elements, as readily appreciated by one of ordinary skill in the art, while maintaining the spirit of the present invention. Moreover, in other embodiments, some of the elements of system/environment 200 can be omitted depending upon the implementation and corresponding logging/analytics requirements. Also, while some elements are shown separately, in other embodiments they can be combined into an integrated element, and vice versa. These and other variations of system/environment 200 are readily determined by one of ordinary skill in the art given the teachings of the present invention provided herein, while maintaining the spirit of the present invention.

Figure 3:
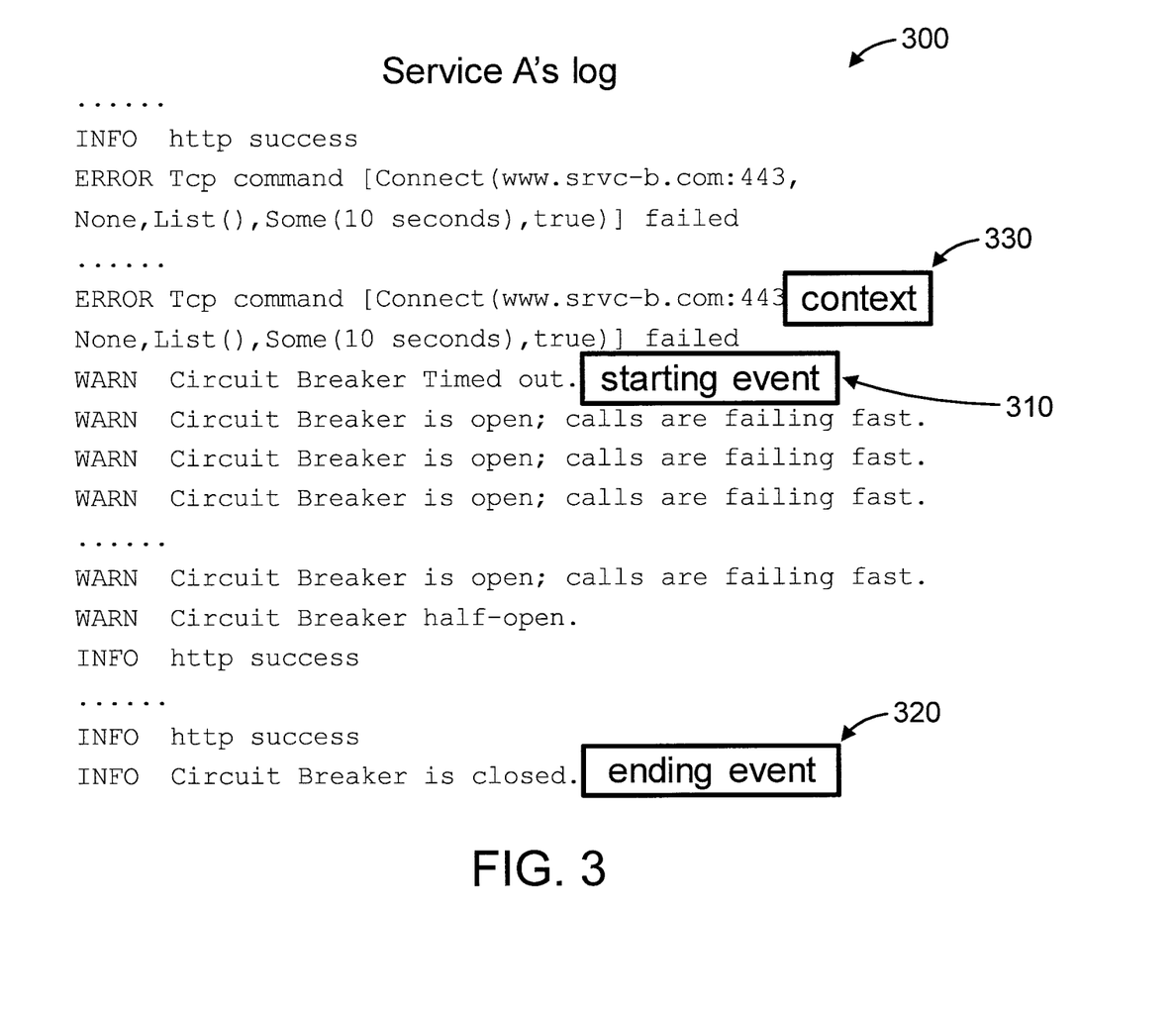
FIG. 3 is a diagram showing an exemplary log portion for micro-service A of FIG. 2, in accordance with an embodiment of the present invention.

A further description will now be given regarding the triggers 213 and 223 of FIG. 2, in accordance with an embodiment of the present invention. FIG. 3 is a diagram showing an exemplary log portion 300 for micro-service A 210 of FIG. 2, in accordance with an embodiment of the present invention. The description of the triggers 213 and 223 will be given with respect to log portion 300 for the sake of illustration.

Referring to FIGS. 2 and 3, each of the triggers (213 and 223) detects its corresponding application's (211's and 221's, respectively) status and starts/stops the augmentation process accordingly. Starting and stopping of the augmentation process are respectively performed responsive to a starting event 310 and an ending event 320 as well as a context 330 of the events 310 and 320. The starting event 310, the ending event 320, and their context 330 are included in the log portion 300. The triggers 213 and 223 can be implemented by, for example, but not limited to flop-flops, and/or other logic circuitry.

A non-intrusive embodiment can involve the following.
By keyword/regex matching logs in buffer.
  Capture the starting event.
  Extract the context information.
  Capture the ending event.
An intrusive embodiment can involve the following.
By hooking logging library.
By directly integrating with a micro-services design pattern library/libraries.

As used herein, the phrase "directly integrating with a micro-services design pattern library/libraries" means the intrusive embodiment will be implemented as part of the micro-services design pattern library/libraries.

Figure 4:
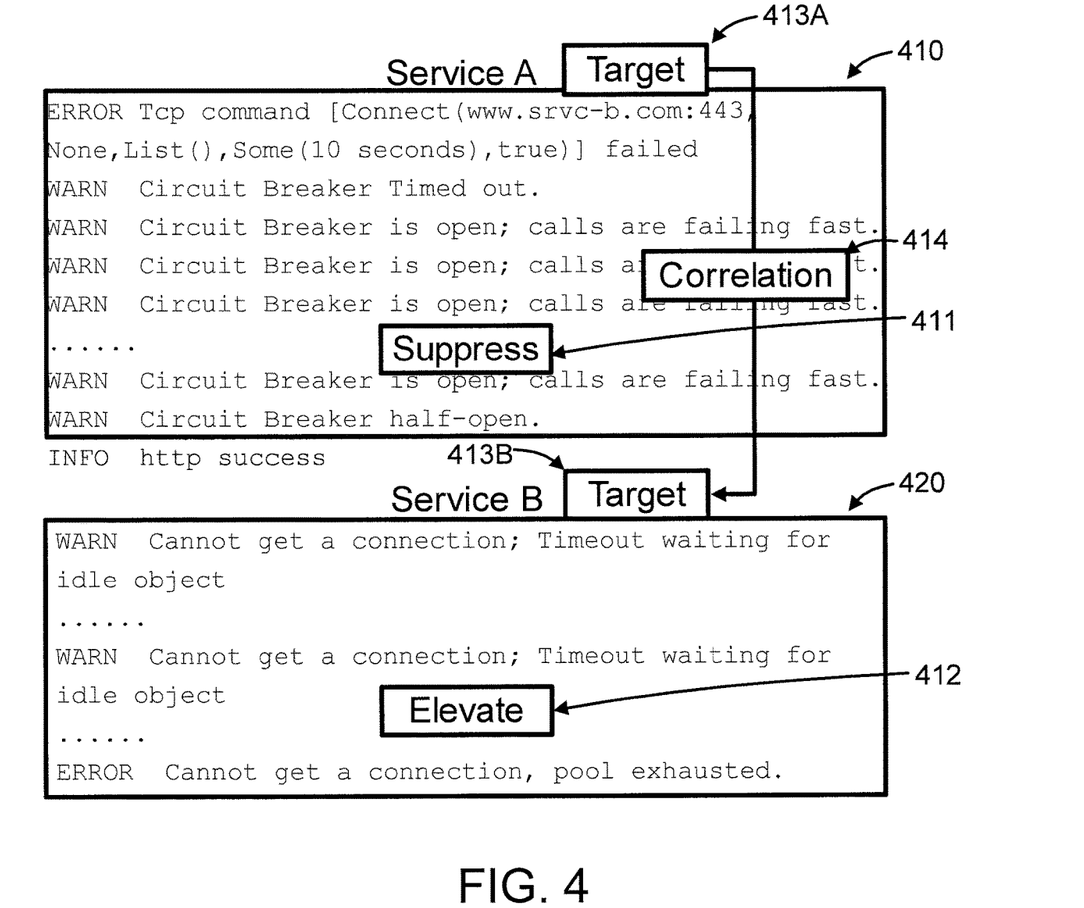
FIG. 4 is a diagram showing respective exemplary log portions and for micro-services A and B, respectively, of FIG. 2, in accordance with an embodiment of the present invention.

A further description will now be given regarding the augmentation rules elements 215 and 225 of FIG. 2, in accordance with an embodiment of the present invention. Each of the augmentation rules elements 215 and 225 can be implemented by respective storage devices or respective portions of a same storage device. FIG. 4 is a diagram showing respective exemplary log portions 410 and 420 for micro-services A 210 and B 220, respectively, of FIG. 2, in accordance with an embodiment of the present invention. As can be seen, the log portions 410 and 410 for micro-service A 210 share common elements and are presented herein for the sake of illustration as having overlapping portions from a larger log file for the sake of brevity. In an embodiment, the augmentation rules elements 215 and 225 can be implemented collectively or independently using a storage element(s) operatively coupled to a processing device(s) (e.g., a controller(s), a processor device(s) (e.g., CPU, GPU, etc.).

Referring to FIGS. 2 and 4, the augmentation rules indicate for the augmentation process what and where are the logs to label.

Exemplary Augmentation Rules can include, but are not limited to the following:
Augmentation Direction
  Suppress 411 the logs related to:
    Events have been handled.
    Resilience actions.
  Elevate 412 the logs related to:
    Events leads to resilience actions.
Augmentation Target
  Local 413A and remote 413B.
  From "context" information in trigger.
Augmentation Correlation 414
  Put target information in augmentation.

Further regarding the augmentation correlation, the augmentation rules dataset with rule management components add the augmentation correlation to augmented logs by placing target specifying information in the augmented logs. In an embodiment, the target specifying information specifies a targeted one of the distributed micro-services, correlated to a targeting one of the two of the distributed micro-services, and from which an augmentation can be obtained. Hence, for micro-service A 210, an augmentation relating to the elevate label can be obtained from micro-service B 220.

A further description will now be given regarding the coordinator and labeler pairs 214 and 224, in accordance with an embodiment of the present invention.

Figure 5:
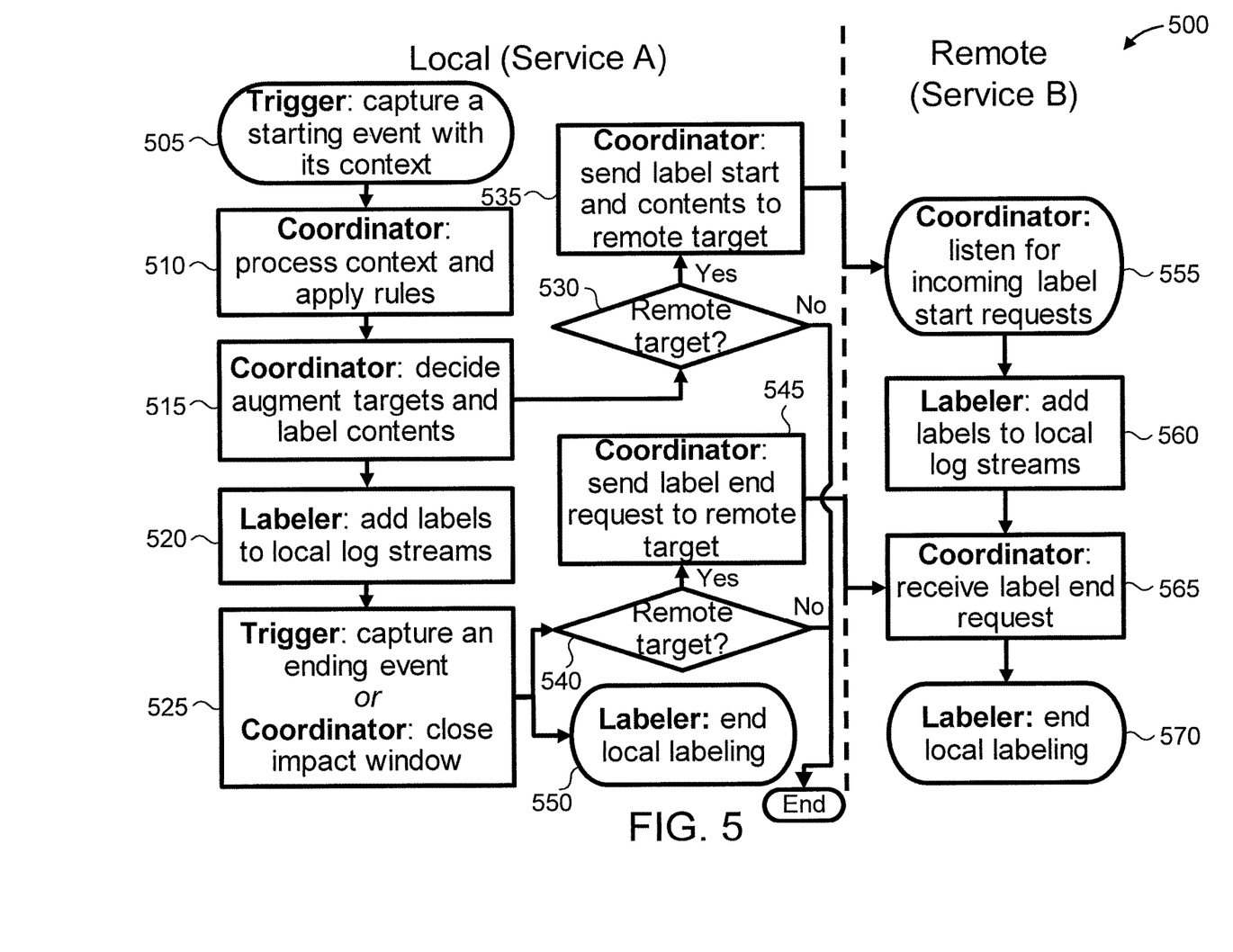
FIG. 5 is a flow diagram showing an exemplary method for log augmentation for a local micro-service A and a remote micro-service B, in accordance with an embodiment of the present invention.

The coordinator and labeler pairs 214 and 224 choose rules and add augmentation labels in distributed logs streams for micro-service A and micro-service B, respectively.
Labels
  Augmentation ID: UUID
  Pattern Type: string
    Circuit break, bulkhead, horizontal scale, container restart, etc.
  Start timestamp: ISO8601
  Suppressed: Boolean
  Elevated: Boolean
  Correlated parties: String
    Service name, URL, domain name, etc.
  Role: String
    Resilience action party, failed party, etc.
  Impact window: millisecond FIG. 5 is a flow diagram showing an exemplary method 500 for log augmentation for a local micro-service A and a remote micro-service B, in accordance with an embodiment of the present invention. Block 505 through 550 are performed by local micro-service A, while blocks 555 through 570 are performed by remote micro-service B.

At block 505, capture, by the trigger, a starting event with its context.

At block 510, process, by the coordinator, context and apply rules.

At block 515, decide, by the coordinator, whether to augment targets and label contents.

At block 520, add, by the labeler, labels to local log streams.

At block 525, capture, by the trigger, an ending event OR close, by the coordinator, the impact window.

At block 530, determine whether a current target is the remote target. If so, then proceed to block 535. Otherwise, terminate the method.

At block 535, send, by the coordinator, a label start request and contents to the remote target.

At block 540, determine whether a current target is the remote target. If so, then proceed to blocks 545 and 550. Otherwise, terminate the method.

At block 545, send, by the coordinator, a label end request to the remote target.

At block 550, end, by the labeler, local labeling.

At block 555, listen, by the coordinator, for incoming label start requests.

At block 560, add, by the labeler, labels to local log streams.

At block 565, receive, by the coordinator, a label end request.

At block 570, end, by the labeler, local labeling.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
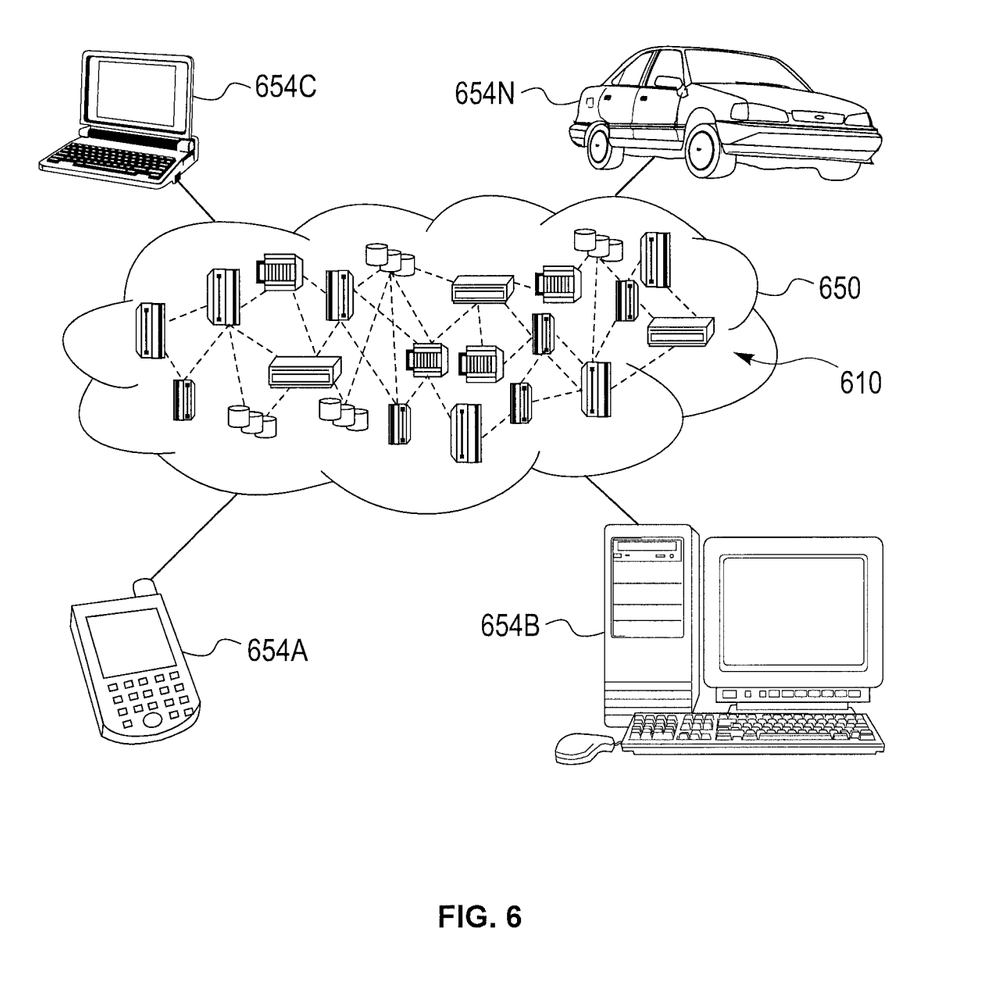
FIG. 6 is a block diagram showing an illustrative cloud computing environment having one or more cloud computing nodes with which local computing devices used by cloud consumers communicate, in accordance with an embodiment of the present invention.

Referring now to FIG. 6, illustrative cloud computing environment 650 is depicted. As shown, cloud computing environment 650 includes one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
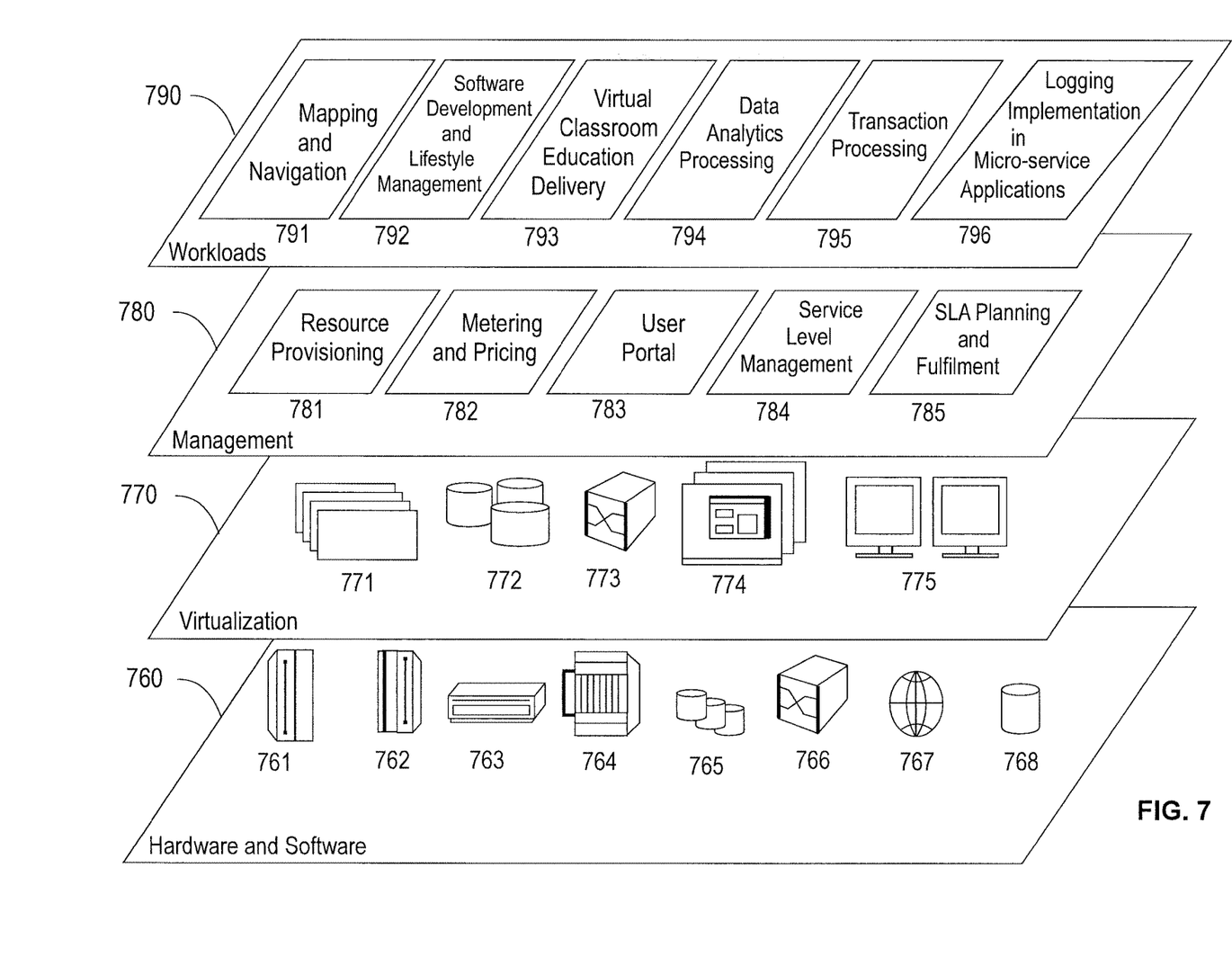
FIG. 7 is a block diagram showing a set of functional abstraction layers provided by a cloud computing environment, in accordance with an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and role-oriented risk checking in contract review based on deep semantic association analysis 796.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A log augmentation system for augmenting log management in a distributed micro-services environment, the log augmentation system comprising:
   a logic circuit for triggering an augmentation process responsive to micro-service related events and a context of the micro-service related events;
   an augmentation rules database with rule management components for determining an augment direction, an augmentation target, and an augmentation correlation relating to the distributed micro-services;
   a coordinator for coordinating the augmentation process in the distributed micro-services using a rule-based decision approach; and
   a labeler for applying a set of labels to augment log entries responsive to instructions from the coordinator derived from results of the rule-based decision approach used by the coordinator,
   wherein the coordinator and the labeler are implemented by at least a hardware processor, and wherein the augmentation direction is selected from a group consisting of elevating and suppressing.

2. The log augmentation system of claim 1, wherein the logic circuit detects the micro-service related events and the context of the micro-service related events for triggering the augmentation process by hooking a logging library.

3. The log augmentation system of claim 1, wherein the logic circuit detects the micro-service related events and the context of the micro-service related events for triggering the augmentation process by directly integrating with a micro-services design pattern library.

4. The log augmentation system of claim 1, wherein the logic circuit detects the micro-service related events and the context of the micro-service related events for triggering the augmentation process by matching of keywords to logs stored in a buffer.

5. The log augmentation system of claim 1, wherein the augmentation rules database with rule management components determine the augmentation direction to involve suppressing logs relating to already handled events and resilience actions.

6. The log augmentation system of claim 1, wherein the augmentation rules database with rule management components determine the augmentation direction to involve elevating logs relating to events that lead to one or more resilience actions.

7. The log augmentation system of claim 1, wherein the augmentation rules database with rule management components determine the augmentation target to include local and remote targets.

8. The log augmentation system of claim 1, wherein the augmentation rules database with rule management components determine the augmentation target from the context used by the logic circuit.

9. The log augmentation system of claim 1, wherein the augmentation rules database with rule management components add the augmentation correlation to augmented logs by placing target specifying information in the augmented logs, the target specifying information specifying a targeted one of the distributed micro-services, correlated to a targeting one of the distributed micro-services, and from which an augmentation for an augmented log entry is obtained.

10. The log augmentation system of claim 1, further comprising an analytics element for performing an analysis on the augmented log entries and initiating, responsive to a result of the analysis, at least one action selected from a group consisting of replacing a failing micro-service, deploying a supplemental micro-service to assist an overloaded micro-service, and removing the failing micro-service from at least one of operation and user access, wherein the analytics element is implemented by at least the hardware processor.

11. A computer-implemented method for augmenting log management in a distributed micro-services environment, comprising:
   triggering, by a logic circuit, an augmentation process responsive to micro-service related events and a context of the micro-service related events;

determining, by an augmentation rules database with rule management components, an augment direction, an augmentation target, and an augmentation correlation relating to the distributed micro-services;

coordinating, by a coordinator, the augmentation process in the distributed micro-services using a rule-based decision approach; and applying, by a labeler, a set of labels to augment log entries responsive to instructions from the coordinator derived from results of the rule-based decision approach used by the coordinator, wherein the coordinator and the labeler are implemented by at least a hardware processor, and wherein the augmentation direction is selected from a group consisting of elevating and suppressing.

12. The computer-implemented method of claim 11, wherein the triggering step detects the micro-service related events and the context of the micro-service related events for triggering the augmentation process by hooking a logging library.

13. The computer-implemented method of claim 11, wherein the triggering step detects the micro-service related events and the context of the micro-service related events for triggering the augmentation process by directly integrating with a micro-services design pattern library.

14. The computer-implemented method of claim 11, wherein the triggering step detects the micro-service related events and the context of the micro-service related events for triggering the augmentation process by matching keywords to logs stored in a buffer.

15. The computer-implemented method of claim 11, wherein the augmentation direction is determined to involve suppressing logs relating to already handled events and resilience actions.

16. The computer-implemented method of claim 11, wherein the augmentation direction is determined to involve elevating logs relating to events that lead to one or more resilience actions.

17. The computer-implemented method of claim 11, wherein the augmentation target is determined to include local and remote targets.

18. The computer-implemented method of claim 11, wherein the augmentation rules database with rule management components determine the augmentation target from the context used by the logic circuit.

19. A computer program product for augmenting log management in a distributed micro-services environment, the computer program product comprising a non-transitory computer readable storage medium having program instructions embodied therewith, the program instructions executable by a computer to cause the computer to perform a method comprising:

triggering, by a logic circuit of the computer, an augmentation process responsive to micro-service related events and a context of the micro-service related events;

determining, by an augmentation rules database with rule management components of the computer, an augment direction, an augmentation target, and an augmentation correlation relating to the distributed micro-services;

coordinating, by a coordinator of the computer, the augmentation process in the distributed micro-services using a rule-based decision approach; and applying, by a labeler of the computer, a set of labels to augment log entries responsive to instructions from the coordinator derived from results of the rule-based decision approach used by the coordinator, wherein the coordinator and the labeler are implemented by at least a hardware processor of the computer, and wherein the augmentation direction is selected from a group consisting of elevating and suppressing.

* * * * *